2,999,670
STATOR CONSTRUCTION FOR ROTARY FLUID MACHINE

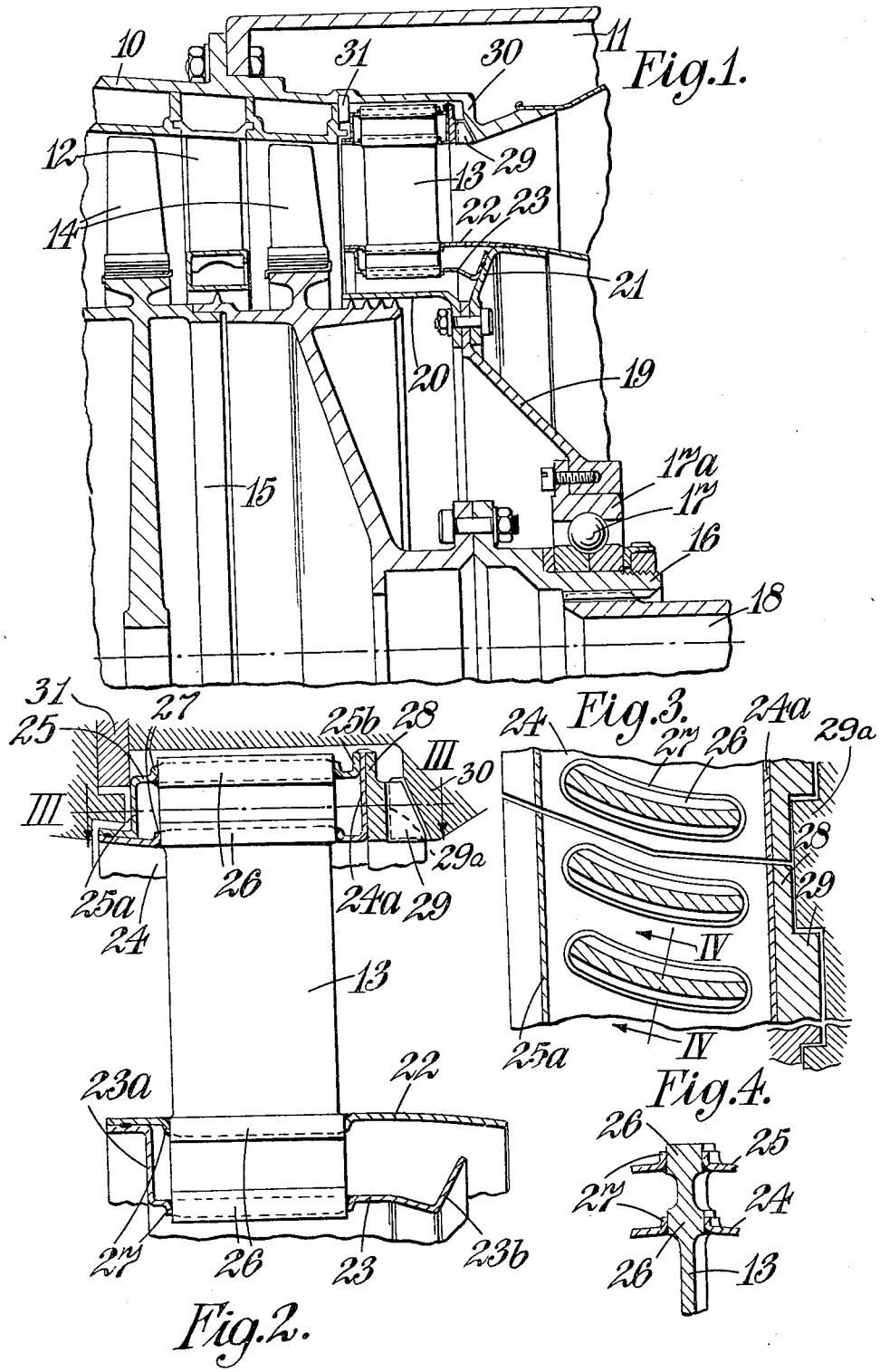

Nigel Edward Payne, Burton-on-Trent, and Ernest Frank Sheldon, Ilkeston, England, assignors to Rolls-Royce Limited, Derby, England, a British company
Filed Oct. 4, 1956, Ser. No. 614,027
Claims priority, application Great Britain Oct. 18, 1955
7 Claims. (Cl. 253—78)

This invention relates to rotary fluid machines, such for instance as compressors or turbines as employed in gas-turbine engines.

Such a rotary fluid machine often comprises a working fluid passage which is annular and is defined in part between outer stator structure and internal stator structure, and this invention is applicable to such a machine.

The present invention has for an object to provide a light but strong construction by which internal stator structure is supported from and located with respect to outer stator structure.

According to the present invention, a stator for a rotary fluid machine comprises outer stator structure and inner stator structure with an annular working fluid passage therebetween and means interconnecting the inner and outer stator structure including a ring of blades or vanes extending across the working fluid passage, which blades or vanes are secured at their inner and outer ends in inner and outer shroud rings respectively, the shroud rings each comprising spaced sheet metal walls which are joined together at their axially-spaced edges and through slots in which the blade ends pass and to which the blade ends are rigidly secured as by brazing, the inner shroud ring being secured to said inner stator structure and the outer shroud ring being located axially in the outer stator structure and being provided with radial dogs or the like co-operating with corresponding elements on the outer stator structure to locate the outer shroud ring circumferentially, and coaxially within the outer stator structure with freedom for radial expansion.

The shroud rings and blades provide a light but strong structure capable of holding the inner stator structure coaxially within the outer stator structure and of transmitting operating loads between the inner and outer stator structures.

According to a preferred feature of this invention, the inner shroud ring is continuous and the outer shroud ring is in a number of part-circular sections.

According to a feature of this invention, the inner stator structure may be support structure for a bearing supporting the rotor of the machine. For instance, the inner stator structure may be a diaphragm carrying at its centre a bearing for the outlet end of the rotor of an axial-flow compressor and in this case the blades joining the inner and outer shroud rings are conveniently the outlet guide vanes of the compressor.

The walls of the shroud rings may be joined together for example by welding over contacting flanges at their axially-spaced edges, or by welding their edges to a heavier gauge ring which in the case of the inner shroud ring may be part of the inner stator structure.

One construction according to this invention will now be described as applied to an axial-flow compressor or an aircraft propulsion gas-turbine engine. The description refers to the accompanying drawings in which:

FIGURE 1 is an axial section through the outlet end of the compressor,

FIGURE 2 is a part of FIGURE 1 drawn to a larger scale,

FIGURE 3 is a developed section on the line III—III of FIGURE 2, and

FIGURE 4 is a section on the line IV—IV of FIGURE 3.

Referring first to FIGURE 1 of the drawings, the compressor comprises an outer casing having an upstream part 10 and a downstream part 11 bolted thereto, a series of rows of stator blading 12 mounted in the casing of which the stator blades of the final stage of the compressor only are shown, a ring of outlet guide vanes 13, and a rotor comprising rotor blades 14 mounted at the periphery of a drum structure 15. The outlet end of the rotor has secured to it a stub shaft 16 and this end of the rotor is supported in a bearing 17 surrounding the stub shaft. The compressor rotor is driven through a shaft 18 which leads to a turbine of the engine (not shown).

The bearing 17 is supported in inner stator structure comprising a frusto-conical diaphragm 19 which has the outer race 17a of the bearing secured to its smaller-diameter end and which has a labyrinth seal element 20 and a flanged ring 21 bolted to it at its larger diameter end.

This inner stator structure is supported from the outer case of the compressor in the following way.

Referring to FIGURES 2–4, the outlet guide vanes 13 are secured at their radially inner and outer ends in inner and outer shroud rings. The inner shroud ring comprises a first sheet metal wall 22 which forms part of the wall of the working fluid passage of the compressor delivery, and a second sheet metal wall 23 radially-spaced from the wall 22 and having a flange 23a at one of its axially-spaced edges by which it is secured to one edge of the wall 22 and a flange 23b at its other edge by which it is welded to the ring 21. The downstream edge of the wall 22 is also welded to the ring 21.

The outer shroud ring comprises a first wall 24 which forms part of the outer wall of the working fluid passage of the compressor and a second wall 25 which is radially-spaced from the wall 24. These walls are interconnected by welding over flanges 25a, 25b, 24a, at their axially-spaced edges.

Each of the walls 22, 23, 24, 25 has formed in it slots corresponding in number to the number of outlet guide vanes 13 and the ends of the outlet guide vanes are fitted into the slots and brazed in position in them. Preferably the outlet guide vanes 13 have at their inner and outer ends pairs of spaced lands 26 which fit in the slots in the walls 22, 23, 24, 25 and co-operate with flanges 27 around the slots to provide a good area of contact between the outlet guide vanes 13 and the walls.

The flange 24a on the wall 24 of the outer shroud ring has secured to it a ring 28 provided on its downstream face with a number of circumferentially-spaced axially-projecting radially-extending dogs 29.

The inner shroud ring is a continuous ring and the outer shroud ring is in a number of part-circular sections.

As has been said above, the walls 22, 23 are welded to the ring 21 which is secured to the diaphragm 19 supporting bearing 17. The outer shroud ring, however, is mounted in the outer casing part 10 so as to be located axially and circumferentially but to be free for radial expansion. For this purpose the casing part 10 is provided with a short radially-extending wall portion 30 having formed thereon circumferentially-spaced axially-projecting radially-extending dog elements 29a to cooperate with the dogs 29, and has fitted in it a radially-extending ring 31 which is spaced upstream from the wall portion 30 and which provides an upstream abutment for the outer shroud ring.

The outer shroud ring is disposed between the wall portion 30 and the ring 31 with the flange 25a of its outer wall in abutment with the ring 31 and with its dogs 29 co-operating with the dogs on the wall portion 30. Thus, not only is the outer shroud ring prevented from axial displacement relative to the compressor casing and is located circumferentially by co-operation of the dogs but also the dogs 29 being radial dogs permit relative radial expansion of the shroud ring and the adjacent portion of the casing part 10 and centralise the outlet guide vane structure, and thus the inner stator structure 17a, 19, 21, within the casing.

It will be appreciated that the structure provided by the outlet guide vanes 13 and their shroud rings 22, 23, 24, 25 is not only light in weight but is also sufficiently rigid to transmit loads experienced in operation from the inner stator structure to the outer casing and to maintain the bearing 17 centrally within the casing.

We claim:

1. A stator for a rotary fluid machine comprising outer stator structure and inner stator structure with an annular working fluid passage therebetween and means interconnecting the inner and outer stator structure including a ring of blades extending across the working fluid passage, which blades are secured at their inner and outer ends in inner and outer shroud rings respectively, each shroud ring comprising a pair of radially spaced sheet metal walls which are joined together at their axially-spaced edges and which have slots through which the blade ends pass, the blade ends being rigidly secured to both walls of each shroud ring as by brazing, the inner shroud ring being secured to said inner stator structure and the outer shroud ring being provided with a ring of circumferentially-spaced axially-projecting radially-extending dogs, a ring of circumferentially-spaced radially-extending elements rigid with the outer stator structure, which elements extend circumferentially between said dogs to locate the outer shroud ring circumferentially and coaxially within the outer stator structure with freedom for radial expansion, and means locating the outer shroud ring axially with respect to the outer stator structure.

2. A stator according to claim 1, wherein the inner shroud ring is continuous and the outer shroud ring is in a number of part-circular sections.

3. A stator as claimed in claim 1, wherein the pair of radially-spaced walls of a shroud ring have contacting flanges at the axially-spaced edges and the flanges are welded together.

4. A stator as claimed in claim 1, wherein two of the edges of the walls of a shroud ring are secured together by the edge of each wall being welded to a further ring of a heavier gauge metal.

5. A stator as claimed in claim 1, wherein each blade is provided at each end with a pair of spaced lands which fit in the slots in the walls of the shroud rings and the walls are provided around the slots with flanges in contact with the lands.

6. A stator for a rotary fluid machine comprising outer stator structure and inner stator structure with an annular working fluid passage therebetween and means connecting the inner and outer stator structure including a ring of blades extending across the working fluid passage with clearance between their ends and said inner and outer stator structure, an inner shroud ring, an outer shroud ring, each shroud ring comprising a plurality of sheets rigidly secured together, each of said sheets having openings through which said blades pass and at which the blades and sheets are welded together to provide a rigid structure with the blades capable of transmitting axial loads and torque without rocking in said openings, the sheets of said inner shroud ring being secured to the inner stator structure to thereby mount the blades for limited radial movement in the clearance, said outer shroud ring having flanges located at its opposite sides out of said passageway, said outer stator structure having a transverse wall opposite one of said flanges, a transversely disposed ring carried by the latter flange at one side of the latter, and circumferentially spaced, interengaged, radially extending dogs projecting axially in opposite directions from said transverse wall and transversely disposed ring, respectively, and means on the outer stator structure extending inwardly and forming an abutment for the other flange of the outer shroud to maintain said first mentioned means in place with said dogs engaged.

7. A stator for a rotary fluid machine according to claim 6 wherein said inner stator structure includes an annular diaphragm means to which the sheets of the inner shroud are fastened at the same side of said ring of blades as said transversely disposed ring.

References Cited in the file of this patent

UNITED STATES PATENTS

| 2,625,013 | Howard et al. | Jan. 13, 1953 |
| 2,640,319 | Wislicenus | June 2, 1953 |
| 2,658,719 | Johanson | Nov. 10, 1953 |
| 2,695,767 | Land et al. | Nov. 30, 1954 |
| 2,747,367 | Savin | May 29, 1956 |
| 2,749,026 | Hasbrouck et al. | June 15, 1956 |
| 2,772,856 | Kent et al. | Dec. 4, 1956 |

FOREIGN PATENTS

| 611,326 | Great Britain | Oct. 28, 1948 |